United States Patent
Schütz

(10) Patent No.: US 11,340,930 B2
(45) Date of Patent: May 24, 2022

(54) CREATING A DATA BACKUP OF A VIRTUALIZED AUTOMATION SOLUTION

(71) Applicant: SIEMENS AKTIENGESELLSCHAFT, Munich (DE)

(72) Inventor: Andreas Schütz, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 295 days.

(21) Appl. No.: 16/480,669

(22) PCT Filed: Jan. 4, 2018

(86) PCT No.: PCT/EP2018/050165
§ 371 (c)(1),
(2) Date: Jul. 24, 2019

(87) PCT Pub. No.: WO2018/137902
PCT Pub. Date: Aug. 2, 2018

(65) Prior Publication Data
US 2021/0157620 A1    May 27, 2021

(30) Foreign Application Priority Data

Jan. 25, 2017 (EP) .................................. 17153054

(51) Int. Cl.
*G06F 9/455*  (2018.01)
*G06F 3/06*   (2006.01)
(Continued)

(52) U.S. Cl.
CPC .......... *G06F 9/45558* (2013.01); *G06F 3/065* (2013.01); *G06F 3/0619* (2013.01);
(Continued)

(58) Field of Classification Search
None
See application file for complete search history.

(56) References Cited

U.S. PATENT DOCUMENTS 8,850,146 B1    9/2014  Majumdar
9,075,649 B1 *  7/2015  Bushman .............. G06F 9/4401
(Continued)

OTHER PUBLICATIONS

"Symantec NetBackup™ for VMware Administrator's Guide—Release 7.5" Symantec (Jan. 12, 2012). pp. 1-190.
(Continued)

*Primary Examiner* — Kenneth Tang
(74) *Attorney, Agent, or Firm* — Lempia Summerfield Katz LLC

(57) ABSTRACT

A method for creating a data backup of a virtualized automation solution running on a virtualization server is provided. A computer program having at least one program code instruction with a specification of data and files to be included in the data backup is executed on the virtualization server based on a call from a remote computer, and the data backup is created as part of the execution of the computer program. A hypervisor is executed on the virtualization server. The computer program includes program code instructions that prompt the hypervisor, prior to the creation of the data backup, to write the configuration files thereof to a boot medium of the hypervisor that is detected by the data backup.

15 Claims, 2 Drawing Sheets

(51) Int. Cl.
  *G06F 21/31* (2013.01)
  *G06F 8/61* (2018.01)
(52) U.S. Cl.
  CPC .......... *G06F 3/0664* (2013.01); *G06F 3/0673* (2013.01); *G06F 21/31* (2013.01); *G06F 8/61* (2013.01); *G06F 2009/45562* (2013.01)

(56) References Cited

U.S. PATENT DOCUMENTS

| | | | |
|---|---|---|---|
| 9,092,248 B1* | 7/2015 | Makin | G06F 11/1402 |
| 9,116,633 B2* | 8/2015 | Sancheti | G06F 9/455 |
| 9,547,562 B1* | 1/2017 | Feathergill | G06F 11/1469 |
| 10,152,387 B1* | 12/2018 | Chakraborty | G06F 9/45558 |
| 2014/0289566 A1* | 9/2014 | Timashev | G06F 11/1469 714/38.1 |
| 2014/0365822 A1* | 12/2014 | Tarves, Jr. | G06F 11/1484 714/15 |
| 2016/0306649 A1* | 10/2016 | Gunti | G06F 9/4406 |
| 2017/0228248 A1* | 8/2017 | Bala | G06T 1/00 |

OTHER PUBLICATIONS

PCT International Written Opinion of the International Searching Authority dated Apr. 12, 2018, for corresponding PCT/EP2018/050165.
European Office Action for European Application No. 18 700 455.1-1203 dated May 11, 2021.
Indian Office Action for Indian Patent Application No. 201937027766 dated Mar. 31, 2021.
Symantec:; "Symantec NetBackup™ for VMware Administralor's Guide"; Release 7.7. (2015) pp. 1-322.

* cited by examiner

CREATING A DATA BACKUP OF A VIRTUALIZED AUTOMATION SOLUTION

This application is the National Stage of International Application No. PCT/EP2018/050165, filed Jan. 4, 2018, which claims the benefit of European Patent Application No. 17153054.6, filed Jan. 25, 2017. The entire contents of these documents are hereby incorporated herein by reference.

BACKGROUND

The present embodiments relate to creating a data backup of a virtualized automation solution.

A virtualization of an automation solution has various advantages. These include that in the event of a failure (e.g., a failure in the hardware of the virtualization server) the automation solution may be transferred to another virtualization server to continue the controlling and/or monitoring of the respective technical process.

Conventional virtualization software often only offers inadequate data backup options.

For example, patent specification U.S. Pat. No. 8,850,146 B1 shows various embodiments for backing up a virtual machine. In this context, the virtual machine, which is running on a first data carrier, may bypass a hypervisor in order to access a passthrough volume more quickly. This, however, complicates backing up the virtual machine, as data may now exist not only on a virtual disk image, but also on a passthrough volume.

If a backup of a virtual machine is to be restored, then it is necessary to reinstall the hypervisor, whereupon the configuration thereof may be restored in a following act. Drivers, scripts, or other software packages, which may have been installed in the hypervisor subsequently, are not captured by the backup of the configuration of the hypervisor and are to be installed afterwards manually with a corresponding time expenditure.

Alternatively, the virtualization server may also be shut down, and the storage medium, on which the hypervisor is installed, may be backed up in a customary manner. This, however, may result in a plant shutdown and is associated with considerable time expenditure.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method, by which all data necessary for operating an automation solution on a virtualization server is able to be captured and backed up in a simple manner, is provided.

A method for creating a data backup of a virtualized automation solution running on a virtualization server includes executing, based on a call from a remote computer, a computer program on the virtualization server. The creation of the data backup takes place under the control of the computer program. The computer program includes a definition of the data and/or files that are to be captured by the data backup. For this purpose, the computer program includes at least one program code instruction with a specification of the data to be included in the data backup. As part of the execution of the computer program by the virtualization server, the data backup is finally created.

The computer program that may be executed by the virtualization server (e.g., a script, an instruction list or the like) prompts all the data and files that are specified in the computer program as necessary for the data backup of the virtualized automation solution to be backed up when the computer program is executed by the virtualization server. The backing up may take place on a piece of hardware that is different from the virtualization server. The piece of hardware is referred to as data backup server in the following for purposes of differentiation. The transferring of the data backup from the virtualization server to the data backup server takes place via a wireless or wire-bound communicative connection between the virtualization server and the data backup server (e.g., via an Ethernet connection that may be secured by the HTTPS protocol).

The advantage of one or more of the present embodiments includes a data backup of a virtualized automation solution, which is transferred to another virtualization server by smoothly restoring the data backup, being possible. There, the data backup of the virtualized automation solution may be brought back into operation with minimal loss of time.

In an embodiment of the method, the hypervisor executed on the virtualization server is prompted by a corresponding call to write corresponding configuration data back onto the boot medium of the hypervisor. In this context, the call may take place at runtime of the virtualization server or the hypervisor, for example. This specific call of the hypervisor is part of the computer program designated for creating the data backup. The hypervisor usually runs entirely in the RAM of the virtualization server, and changes to the configuration are only saved when the configuration file or the configuration files of the hypervisor is/are saved on a storage medium of the virtualization server (e.g., the boot medium of the hypervisor). Usually, this takes place automatically and at regular intervals (e.g., every hour). A data backup, which runs immediately after such an automatic backup of the configuration, does not capture changes to the configuration that take place up until the next automatic backup. The specific call of the hypervisor causes, due to a corresponding position in the computer program, the configuration data to be written back before creating the data backup. This provides that, when the data backup is created, the current configuration of the hypervisor is always backed up if the save location of the configuration files is captured by the data backup. This provides that, for example, in the case of a regular (e.g., periodic) backup of the configuration of the hypervisor, a call takes place to back up the configuration of the hypervisor (e.g., at a point in time between two regular backups). In this case, the backup may contain the actual configuration of the hypervisor, as well as one or more software packages, such as one or more drivers and/or scripts (e.g., installed subsequently, after the installation of the hypervisor).

In an embodiment of the method, the call of the computer program for creating the data backup takes place via a web browser on the calling computer (e.g., in the form of a call such as https:\\<IP address of the virtualization server>\backup.html).

The compiling of the data backup may then be triggered in a particularly simple and straightforward manner, and also from a remote location. Particular detailed knowledge is not required on the part of the operator who is prompting the compiling of the data backup in this manner, and accordingly, the method may also be carried out by untrained personnel (e.g., at certain points in time or at regular intervals).

The subclaims are not to be understood as a renunciation of the achievement of independent, objective protection for the feature combinations of the dependent claims referring back thereto. With regard to an interpretation of the claims and the description upon closer ascertainment of a feature in a subordinate claim, it may be assumed that such a restriction in the respective preceding claims and a more general embodiment of the objective data backup method does not exist. Any reference made in the description to aspects of subordinate claims is accordingly also to be read, without specific indication, explicitly as features optional to the description. Finally, the method set forth may also be developed in accordance with the dependent device claims, and vice versa.

The method for creating a data backup of one or more of the present embodiments is realized for automatic execution in the form of a computer program. The computer program is designated for execution by a computer system. The executing computer system is the virtualization server in this context. Where method acts or method act sequences are described in the following, this refers to actions that take place based on the computer program or under the control of the computer program unless it is indicated explicitly that individual actions are initiated by a user of the computer program.

The computer program is an implementation of the objective method for creating a data backup in software. Instead of a computer program with individual program code instructions, the implementation of the method described here and below may also take place in the form of firmware. It is clear to a person skilled in the art that in place of an implementation of a method in software, an implementation in firmware or in firmware and software or in firmware and hardware is always possible. Therefore, for the description set forth here, it should be the case that the terms software and computer program also encompass other implementation possibilities (e.g., an implementation in firmware or in firmware and software or in firmware and hardware).

The present embodiments provide a computer program with program code instructions that may be executed by a computer to create a data backup of a virtualized automation solution, provide a storage medium with such a computer program (e.g., a computer program product with program code means), and provide a computer system (e.g., the virtualization server) in the memory of which such a computer program is loaded or may be loaded as a way for carrying out embodiments of the method.

Exemplary embodiments are explained in more detail below with reference to the drawing. Objects or elements corresponding to one another are labeled with the same reference characters in all of the figures.

BRIEF DESCRIPTION OF THE DRAWINGS

The exemplary embodiment is not to be understood as a restriction of the invention. Rather, in the context of the present disclosure, enhancements and modifications are possible. For example, enhancements and modifications that, for the person skilled in the art, are derivable by combination or modification of individual features or method acts included in conjunction with those described above and below and in the claims and/or the drawings, and by combinable features, lead to a new subject matter or new method acts or method act sequences).

DETAILED DESCRIPTION

Figure 1:
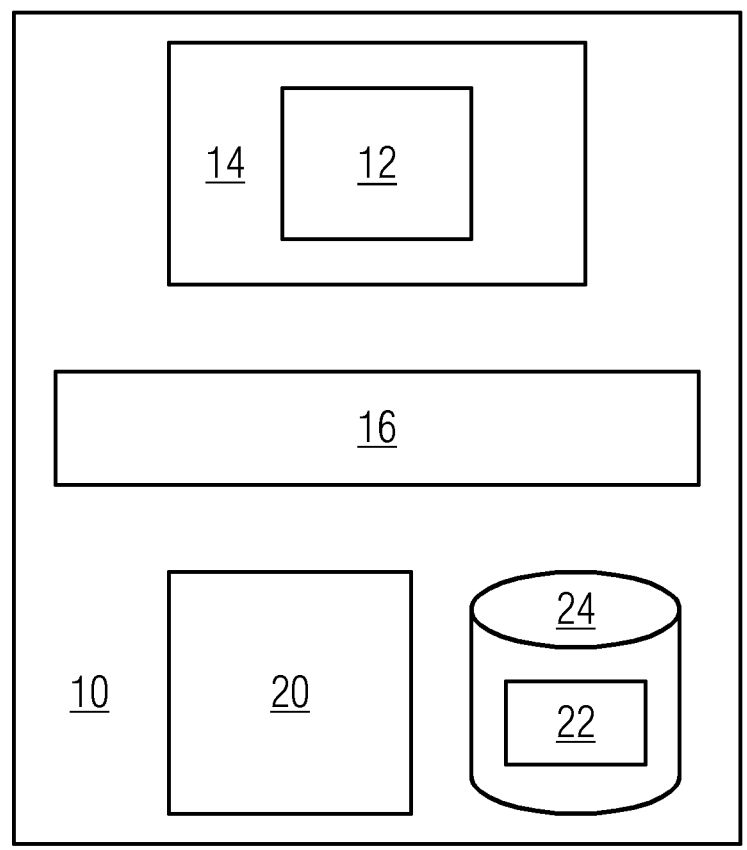
FIG. 1 shows a virtualization server with an automation solution to be backed up that runs thereon, as well as a data backup server.
Figure 1:
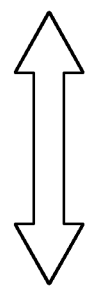
Figure 1:
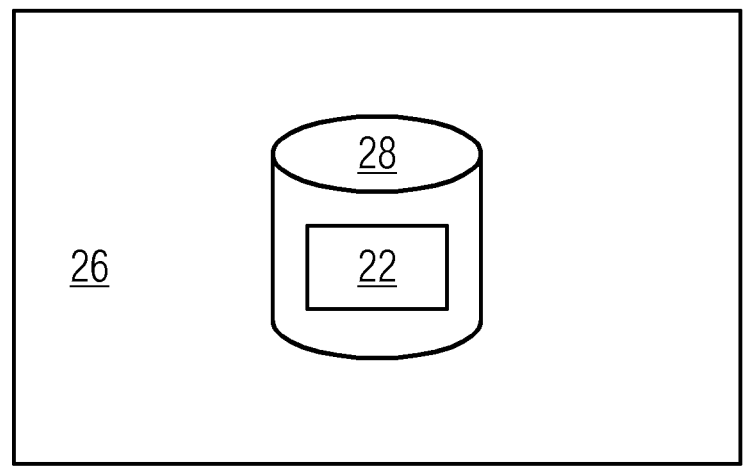

The representation in FIG. 1 shows a virtualization server 10 that is per se known in principle, in a highly simplified schematic manner. An automation solution 12 runs on the virtualization server 10. As part of the execution of the automation solution 12 by the virtualization server 10, a controlling and/or monitoring of a technical process, which itself is not shown, likewise takes place in a manner that is per se known in principle. The execution of the automation solution 12 takes place using one or more virtual machines 14. Using further virtual machines 14, further automation solutions 12 may be executed on the same virtualization server 10. In the representation in FIG. 1, only a single virtual machine 14 that considers simple relationships is shown. What is known as a hypervisor 16 functions as an interface between the virtual machine 14 or a plurality of virtual machines 14 and the hardware (not shown) of the virtualization server 10.

To back up the data of a virtualized automation solution 12 in accordance with the approach proposed here, provision is made for a computer program 20 that may be executed by the virtualization server 10. The computer program 20 is called by a remote computer 26 that has a communicative connection with the virtualization server 10, via the Internet, for example. The computer program 20 involves a script, an instruction list, or the like, for example. When executed by the virtualization server 10, the computer program 20 prompts a backup of all data and files specified in the computer program 20, and the result is a data backup 22 of the virtualized automation solution 12. The data backup 22 is first buffered in a local mass storage device 24 of the virtualization server 10 or a mass storage device that may be reached by the virtualization server 10. Once the backup has completed, the data backup 22 is transferred to the computer 26 that has called the computer program 20 to generate the data backup 22. This calling computer 26 thus functions as a save location for the data backup 22 and is also accordingly referred to as data backup server 26. There, the data backup 22 is saved in a local mass storage device 28 of the data backup server 26 or a mass storage device that may be reached by the data backup server 26. The virtualization server 10 and the data backup server 26 are also communicatively connected to one another in a manner that is per se known in principle for this data transfer from the virtualization server 10 to the data backup server 26, and a connection provided via the Internet is also used for this data transfer, for example. The transfer of the data of the data backup 22 to the data backup server 26 may take place in a secured format (e.g., according to the HTTPS protocol).

Figure 2:
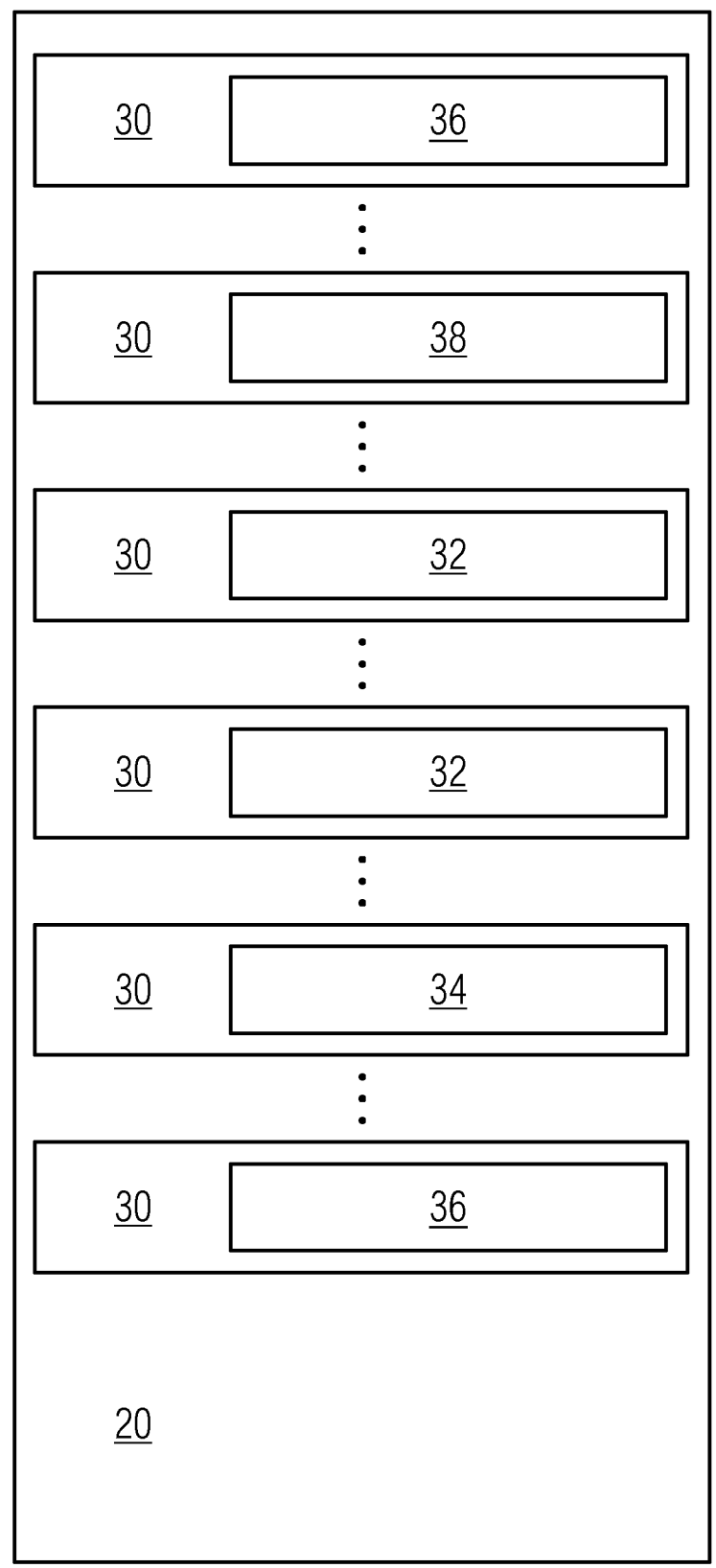
FIG. 2 shows a computer program designated for backing up the automation solution running on the virtualization server.

The representation in FIG. 2 shows, in a likewise highly simplified schematic manner, the computer program 20 executed by the virtualization server 10 for generation of the data backup 22, with individual further details. The computer program 20 includes, in a per se known manner, program code instructions 30 as program code means. These include, for example, one or more program code instructions 30 with a specification 32 of the data and/or files relevant for the backup of the virtualized automation solution 12. Each of one or more program code instructions 30 with such a specification 32 is an example of a definition of the data/files necessary for the backup of the virtualized automation solution 12. Each program code instruction 30 with such a specification 32 causes a backup of the or each file and/or data items known by the specification 32. Alternatively, each program code instruction 30 of this kind causes the data backup 22, which is called by at least one program code instruction 30 executed at a later time, to include the respective data. As part of such a specification 32, the hypervisor 16 may be prompted to write the configuration file or the configuration files of the hypervisor 16 back onto the boot medium of the hypervisor 16 before creating the data backup 22. The data included by at least one specification 32 also includes the boot medium of the hypervisor 16, providing that the boot medium is taken into consideration during the backup and it is thus provided that the configuration data of the hypervisor 16, which has been written back, is captured by the data backup 22.

After executing all program code instructions 30 with such a specification 32 and/or executing the respective program code instructions 30 that process the at least one specification, the data backup 22 is available and may be transferred to the data backup server 26. This takes place using at least one program code instruction 30 that specifies the data transfer target 34 (e.g., in the form of the address of the data backup server 26).

Optionally, the computer program 20 may include program code instructions 30 for the occupation of a semaphore 36, which is per se known in principle, or the like at the start of the program execution and for clearing the semaphore 36 at the end of the program execution. In this or a similar manner, it may be provided that the computer program 20 is not simultaneously executed multiple times.

Further optionally, the computer program 20 may include program code instructions 30 for authentication 38 of a user, so that the data backup 22 is only then created and, as part of the computer program 20, is only then downloaded to the data backup server 26 if the operator calling the computer program 20 identifies themselves as authorized to create the data backup 22 by entering a user name and password, for example.

Although the invention has been illustrated and described in detail based on the exemplary embodiments, the invention is not limited by the disclosed example or examples, and other variations may be derived herefrom by the person skilled in the art without departing from the scope of protection of the invention.

One or more of the present embodiments enable a data backup 22 of a virtualized automation solution 12 running on a virtualization server 10, where a computer program 20 with at least one program code instruction 30 with a specification 32 of data and files to be included in the data backup 22 is executed on the virtualization server 10 as a result of a call from a remote computer 26. The data backup 22 is created as part of the execution of the computer program 20.

In the event of a failure (e.g., due to a software or hardware fault), the virtualization server or a substitute virtualization server thus may be quickly brought back into operation. In this case, a more up-to-date data backup is present than if, for example, a backup is only carried out according to the regular (e.g., periodic).

If one wishes to restore the data backup, then first the hypervisor is to be reinstalled, and then, the backed-up configuration of the hypervisor is to be restored. Drivers, scripts, or other software packages, which may have been installed in the hypervisor subsequently, were not part of the configuration backup and until now had to be installed afterwards manually. Using the data backup of one or more of the present embodiments (e.g., not only the actual configuration of the hypervisor, but also one or more software packages, such as one or more drivers and/or scripts), the installation of the hypervisor, as well as the configuration of the hypervisor and the installation of software packages subsequently installed in the hypervisor, may be carried out in a simple manner.

Alternatively, the virtualization server may be shut down, and the storage medium, on which the hypervisor is installed, may be backed up via traditional methods (e.g., boot CD, expand the storage medium, etc.). This, however, results in a plant shutdown and is associated with considerable time expenditure.

A script is installed on the hypervisor or the virtualization server, either manually or during an automated installation, for example, by a kickstart script. This installed script makes it possible to create a backup of the hypervisor during the ongoing operation (e.g., at runtime) and to load the backup of the hypervisor from the hypervisor server using a network connection via HTTPS, for example. In some circumstances, no administrative access to the server vis SSH or the like is needed. In order to create a backup, a third-party computer with network access may call an address via a browser, for example. The call is secured by user name and password. Following successful authentication, the virtualization server may first back up all changes to the configuration that have not yet been written to the storage medium and/or create a complete backup of the hypervisor boot medium, via disk dump, for example. Once the backup has completed, a downloading of the backup copy to the calling computer may take place automatically. The script (e.g., installed on the hypervisor) provides that only one backup (e.g., a data backup) may be created in parallel in order to provide the fault-free operation of the virtualization server.

In the event of a server failure, the backup obtained in this manner may be restored on an SD card or a USB stick, in order to bring the failed server, or a substitute server, back into operation.

By avoiding a plant shutdown, it is possible to create a backup independently of the maintenance cycle of the plant and thus also, consequently, more frequently, which offers more security in the event of a service failure. The backup may be restored with considerably less time expenditure. Not only is less time required, but less specialist knowledge as well.

The creation of the backup takes place, for example, via web access, during the ongoing operation, for example, without administration access to the server. The backup is transferred from the server to a PC via HTTPS download. At the same time, it is provided that the server operation is not interrupted, in that the operation of the virtual machines and thus the plant has a higher priority.

Via administrative access to the server, via SSH for example, it may likewise be possible to create a backup during ongoing operation. Via SCP, the backup created in this way may be transferred to another computer. This may, however, unintentionally bring about a failure of the server due to a typing error, for example.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for creating a data backup of a virtualized automation solution running on a virtualization server, the method comprising:
executing a computer program with at least one program code instruction with a specification of data and files to be included in the data backup on the virtualization server as a result of a call from a remote computer;
executing a hypervisor on the virtualization server;
prompting, before creating the data backup, by computer program code instructions of the computer program, the hypervisor to write configuration files of the hypervisor to a boot medium of the hypervisor, wherein the configuration files of the hypervisor are configured to be captured by the data backup when the data backup is created; and
creating the data backup as part of the executing of the computer program,
wherein the specification of the data to be included in the data backup contains the configuration files of the hypervisor and one or more software packages, and
wherein the one or more software packages are installed after installation of the hypervisor.

2. The method of claim 1, wherein the one or more software packages comprise at least one driver, at least one script, or the at least one driver and the at least one script.

3. The method of claim 1, further comprising blocking a simultaneous multiple execution,
wherein the simultaneous multiple execution is prevented during the executing of the computer program.

4. The method of claim 1, further comprising authenticating a user, such that authorization of the user is checked before the creating of the data backup.

5. The method of claim 1, further comprising transferring the data backup to the remote computer.

6. A non-transitory computer-readable storage medium that stores instructions executable by a virtualization server to create a data backup of a virtualized automation solution running on a virtualization server, the instructions comprising:
executing a computer program with at least one program code instruction with a specification of data and files to be included in the data backup on the virtualization server as a result of a call from a remote computer;
executing a hypervisor on the virtualization server;
prompting, before creating the data backup, by computer program code instructions of the computer program, the hypervisor to write configuration files of the hypervisor to a boot medium of the hypervisor, wherein the configuration files of the hypervisor are configured to be captured by the data backup when the data backup is created; and
creating the data backup as part of the executing of the computer program,
wherein the specification of the data to be included in the data backup contains the configuration files of the hypervisor and one or more software packages, and
wherein the one or more software packages are installed after installation of the hypervisor.

7. The non-transitory computer-readable storage medium of claim 6, the instructions further comprising blocking a simultaneous multiple execution,
wherein the simultaneous multiple execution is prevented during the executing of the computer program.

8. The non-transitory computer-readable storage medium of claim 6, the instructions further comprising authenticating a user, such that authorization of the user is checked before the creating of the data backup.

9. The non-transitory computer-readable storage medium of claim 6, the instructions further comprising transferring the data backup to the remote computer.

10. The non-transitory computer-readable storage medium of claim 6, wherein the one or more software packages comprise at least one driver, at least one script, or the at least one driver and the at least one script.

11. A virtualization server comprising:
a processor; and
a memory configured to store a computer program including instructions executable during operation of a virtualization server as a result of a call by a remote computer to create a data backup of a virtualized automation solution running on the virtualization server, the instructions comprising:
executing, by a processor, a computer program with at least one program code instruction with a specification of data and files to be included in the data backup on the virtualization server as a result of the call from the remote computer;
executing a hypervisor on the virtualization server;
prompting, before creating the data backup, by computer program code instructions of the computer program, the hypervisor to write configuration files of the hypervisor to a boot medium of the hypervisor, wherein the configuration files of the hypervisor are configured to be captured by the data backup when the data backup is created; and
creating, by the processor, the data backup as part of the executing of the computer program,
wherein the specification of the data to be included in the data backup contains the configuration files of the hypervisor and one or more software packages, and
wherein the one or more software packages are installed after installation of the hypervisor.

12. The virtualization server of claim 11, the instructions further comprising blocking a simultaneous multiple execution,
wherein the simultaneous multiple execution is prevented during the executing of the computer program.

13. The virtualization server of claim 11, the instructions further comprising authenticating a user, such that authorization of the user is checked before the creating of the data backup.

14. The virtualization server of claim 11, the instructions further comprising transferring the data backup to the remote computer.

15. The virtualization server of claim 11, wherein the one or more software packages comprise at least one driver, at least one script, or the at least one driver and the at least one script.

* * * * *